United States Patent [19]

Menn

[11] Patent Number: 4,786,271

[45] Date of Patent: Nov. 22, 1988

[54] COUPLING FOR END-TO-END ROTATABLE SHAFTS

[76] Inventor: Pavel M. Menn, Eight Maverick Ct., Marblehead, Mass. 01945

[21] Appl. No.: 54,067

[22] Filed: May 19, 1987

Related U.S. Application Data

[63] Continuation of Ser. No. 794,167, Nov. 1, 1985, abandoned.

[51] Int. Cl.$^4$ .......................... F16D 3/26; F16D 3/50
[52] U.S. Cl. ..................... 464/140; 464/35; 464/139; 464/147; 464/155
[58] Field of Search ...................... 464/30, 35, 37, 102, 464/103, 106, 113, 114, 119, 120, 139, 140, 141, 147, 150, 152, 153, 155

[56] References Cited

U.S. PATENT DOCUMENTS

| | | | |
|---|---|---|---|
| 636,758 | 11/1899 | Casaday | 464/114 |
| 2,696,124 | 12/1954 | Flowers et al. | 464/139 X |
| 2,881,602 | 4/1959 | Baker et al. | 464/35 |
| 3,045,454 | 7/1962 | Rueb | 464/119 |
| 3,096,453 | 7/1963 | Behar | 464/35 X |
| 3,574,878 | 4/1971 | Shames et al. | 464/35 X |
| 4,493,676 | 1/1985 | Krude | 464/141 |

FOREIGN PATENT DOCUMENTS

| | | | |
|---|---|---|---|
| 2658884 | 6/1978 | Fed. Rep. of Germany | 464/140 |
| 872832 | 10/1981 | U.S.S.R. | 464/30 |
| 2171492 | 8/1986 | United Kingdom | 464/141 |

Primary Examiner—Daniel P. Stodola

[57] ABSTRACT

A shaft coupling which can prevent trransmission of side loads in the event of angular or parallel misalignment of end-to-end shafts and which can also provide non-destructible overload protection. A pair of independent translatable devices spaced apart along the axis of the coupling, and set in planes at right angles to the axis and to each other can translate independently to permit free nutating motion of an intermediate torque-transmitting coupling member. Spring loaded balls on the ends of the independent devices decouple the shafts from each other in the event of overload. Embodiments can achieve all of the above with virtually zero back lash.

14 Claims, 3 Drawing Sheets

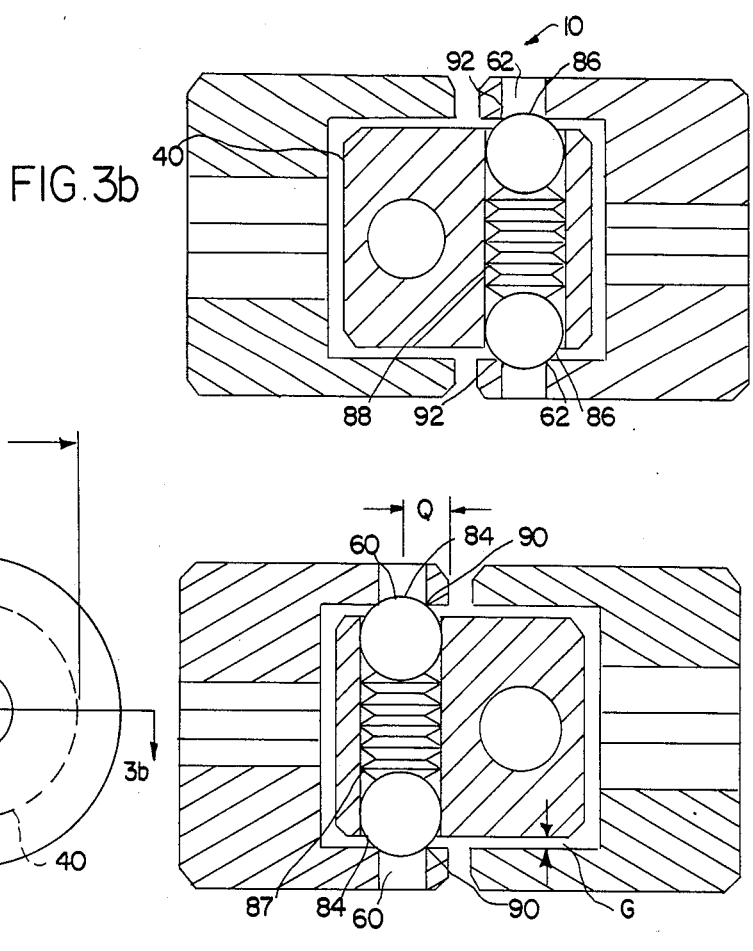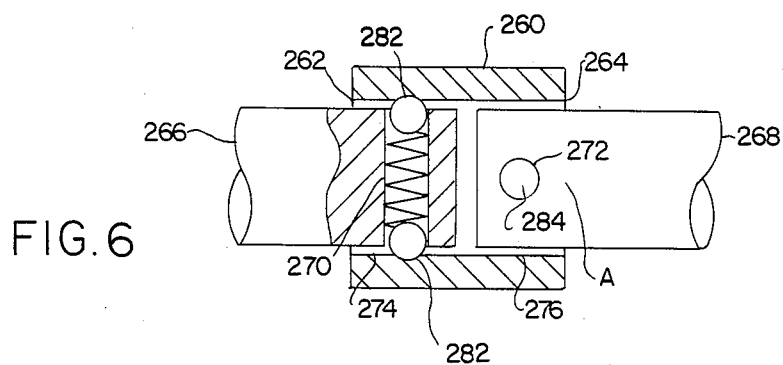

COUPLING FOR END-TO-END ROTATABLE SHAFTS

This application is a continuation, of application Ser. No. 794,167, filed Nov. 1, 1985, now abandoned.

This invention relates to couplings that link end-to-end, rotatable shafts, for transmission of motion or power.

Ideally, one would wish for a combination of three attributes for such couplings. The shafts should be in perfect axial alignment or the coupling should readily tolerate angular misalignment as well as axial (parallel) offset without generating sideloads; the coupling should transmit motion perfectly in forward and reverse direction, without so-called backlash, lost motion or added hysteresis; and there should be inherent, non-destructible overload protection so that overload on one shaft would immediately terminate transmission to or from the other shaft, but transmission would automatically be restablished upon removal of the overload condition.

In practice these ideals are most difficult to realize. It requires considerable expense and disadvantageous trade-off to even come close to such an arrangement. For instance, it is common, unless the time and expense of extremely precise installation procedure are incurred, for shafts to be angularly misaligned with each other by one or a few degrees and axially off-set from one another by 0.005 inch or more. The result has been transfer of side-loads between the shafts and requirement that the bearings and seals be sufficiently large capacity (and costly) to accept such side loads.

Attempts to tolerate misalignment have also resulted in use of flexible couplings which, however, have added to the back-lash problem, as well as to cost.

Provision of overload protection has often been obtained by use of shear pins or other destructible devices, with the disadvantage of costly downtime while a mechanic replaces a sheared pin. Special overload protective devices have been available but with disadvantages such as added expense, additional mass or length, etc.

Therefore, despite a long-felt need, no coupling principle has been known which permits realization of these attributes in advantageous, relatively low cost and low mass constructions. In particular, it is believed that no one heretofore has provided a means to achieve all three attributes in a simple and relatively low cost single device.

Important objects of this invention are to provide improved coupling principles and modes of construction to achieve marked improvement in various coupling attributes. Especially important, but not the only object, is to achieve all three of the above-mentioned attributes simultaneously with a simple, single unit.

SUMMARY OF THE INVENTION

A basic principle of the invention is the use, for dealing with misaligned end-to-end shafts, of a coupling that employs a pair of pivotal connections at right angles to each other defined by translatable devices, to accomodate misalignment the coupling enabling the interconnected elements at each of the connections to translate relative to each other along the pivot axes, as well as to rotate relative to one another about the pivot axes.

According to a preferred aspect of the invention, a coupling between two end-to-end rotatable shafts comprises an intermediate member disposed between and loosely related in male-to-female relationship to each of the shafts, or extensions of the shafts, to form a pair of male-to-female joints, the male part of each joint having torque-transmitting means lying on each side of a diameter, opposed torque-transmitting means disposed on the interior of the female member of each joint and in registry with the torque-transmitting means of the respective male part, and rotatable translatable means disposed within and extending into load-transferring relationship between respective torque-transmitting means on the male and female parts to transmit the torque between the members of each joint via shear-loading, the coupling being constructed and arranged to ensure that the translatable members are confined to translate in directions perpendicular to one another, and, in the event of misalignment between the loosely related pairs of parts, the translatable means adapted to translate relative to the male member and rotate about their own axes relative to the respective torque-transmitting means during rotation of the coupling whereby the intermediate member can continually adjust itself in nutating motion relative to the shafts to accomodate misalignment.

According to a preferred embodiment of the invention, the coupling comprises a pair of torque-transmitting hubs of rigid material disposed along the general rotational axis of the coupling, each defining an end of the coupling and having attachment means to enable it to be secured to its respective shaft, the inner side of each hub having a central bore aligned with the rotational axis of the hub, the intermediate member extending between the two hubs and having its respective ends disposed within the central bores of the respective hubs to form the pair of male-to-female joints, the torque-transmitting means of the hubs comprising engaging means that are disposed on the inner peripheral wall of each of the central bores and lie on a cross-axis in a plane perpendicular to the rotational axis of the respective hub, the intermediate member has a pair of cross bores lying in planes perpendicular to and spaced apart along the axis of rotation of the intermediate member, the axes of the cross bores also lying in planes perpendicular to one another and positioned to register with respective pairs of the torque-transmitting engaging means in the respective hubs.

In various embodiments of the invention one or more of the following advantageous features can be employed: each of the axially spaced-apart translatable devices and its respective torque-transmitting engagable means are cooperatively constructed to enable disengagement when a selected torsional load is exceeded and to re-engage when the torsional load is reduced, whereby non-destructible overload protection can be provided while shaft misalignment can be accomodated; each translatable device comprises two end members of rigid material at the ends of a respective cross bore in the intermediate member and preloaded compressional spring means within the cross bore bias the rigid members in the direction of the axis of the cross bore, into load-transmitting, rotatable relationship with the pair of engagement means provided in a hub, the cross load exerted by the translatable member upon the respective pair of engagement means thereby being substantially balanced through the body of the hub throughout a cycle of rotation of the coupling, to avoid imposition of cross-loads on the respective shaft; the end members are comprised o wear-resistant material and have at their ends, surfaces of revolution centered on the axes of the translatable devices and adapted to make circular line-bearing contact with the opposed engagement means to enable rotation relative to the respective engagement means, preferably the end members having substantially spherical surfaces interfitted with respective engagement means of smaller diameter, more preferably the end members comprising bearing balls; the engagement means comprise outwardly-extending indentations or holes in the effective inner walls of the female part of each joint bounded by a circular rim, constructed to make rotatable contact with the translatable member on a circular bearing line; the compressional spring means comprises an axial assembly of belleville washers aligned with the axis of the respective cross-bore and tightly engaged upon one another to functionally prevent their transverse slippage; in combination, the translatable load-transmitting device comprises a pair of bearing balls and a compressional spring means therebetween and the torque-transmitting engaging means comprise circular, outwardly-extending formations in the inner wall of the bore of a female part of the respective joint; translatable members engage the engagement means in a manner making simultaneous solid contact at different points capable of transmitting torque in different directions of rotation in a manner to prevent back-lash or hysteresis; the engagement means of a female part of a joint comprise engageable formations in the inner peripheral wall of the female part and the translatable means has ends that are resiliently biased apart by springs that are grounded upon an internal spacer within the cross bore that is spring-loaded to continually engage the wall of the cross-bore, whereby the translatable device is always engaged, without lost motion, for each direction of rotation; and the female part of each joint is comprised of an aluminum outer body and a hardened tubular steel insert, the insert disposed in a bore of the female part, the insert having opposite holes adapted to define the formations for engagement by the translatable devices.

Other features and advantages of the invention will be understood from the following description of the presently preferred embodiments and from the claims.

DESCRIPTION OF THE PREFERRED EMBODIMENTS

We first briefly describe the drawings.

DRAWINGS

FIG. 3 is an end view of the coupling of FIG. 2;

Figure 4:
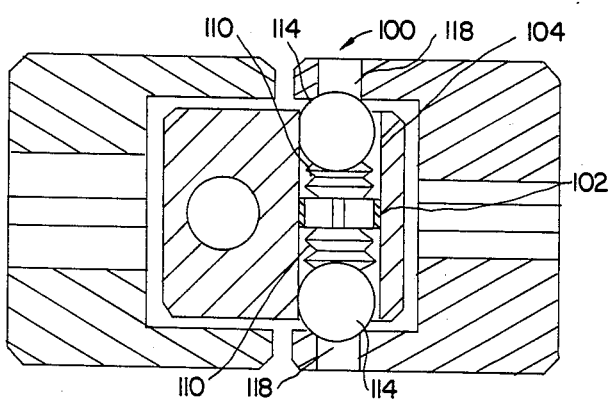
Figure 5:
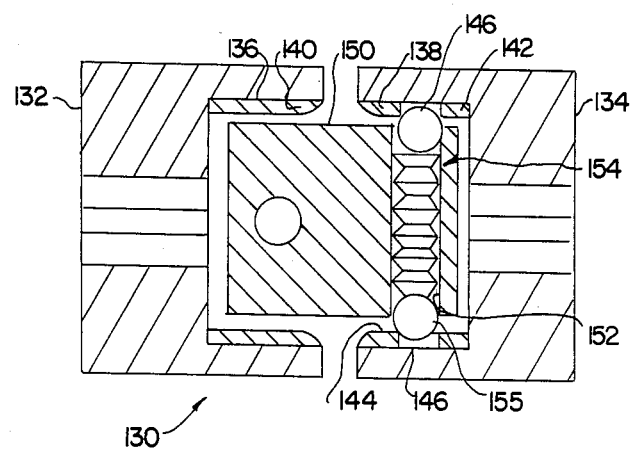

FIGS. 3a and 3b are sectional views taken along lines 3a and 3b of FIG. 3, respectively, of the coupling, at 90° to each other;

FIGS. 4, 5 and 6 are sectional views of other embodiments of the coupling of the invention;

STRUCTURE

Figure 1:
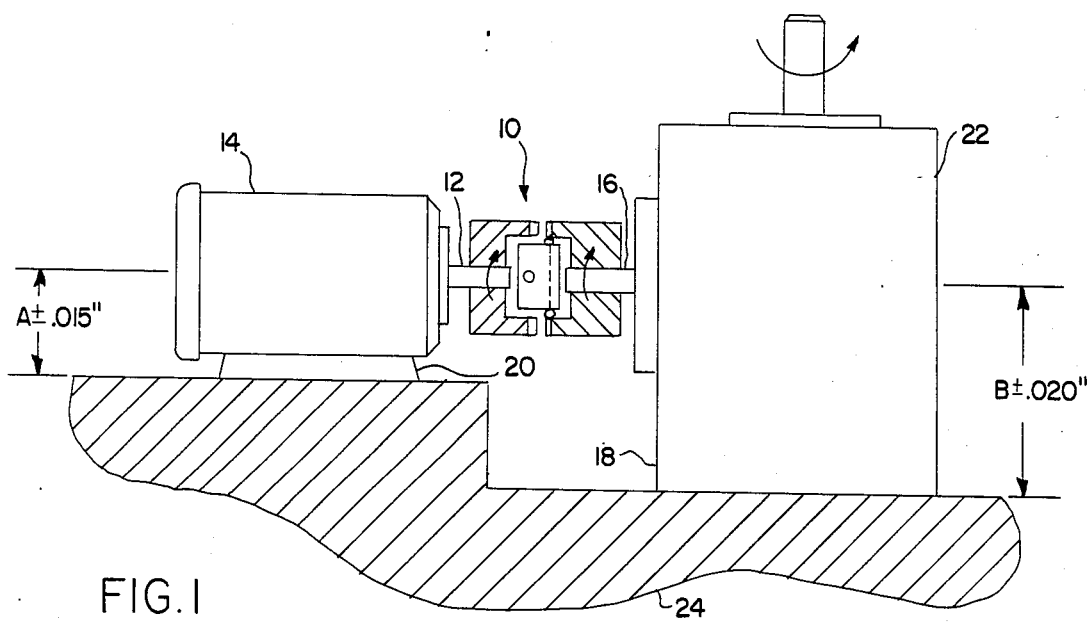
FIG. 1 is a somewhat diagrammatic representation of a driving unit and a driven unit, coupled by a coupling according to the invention.

Referring to FIG. 1, coupling 10 links the rotatable shaft 12 of motor 14 to the rotatable shaft 16 of speed reducer 22. Motor mount 20 and speed reducer base 18 are attached to floor 24.

Figure 2:
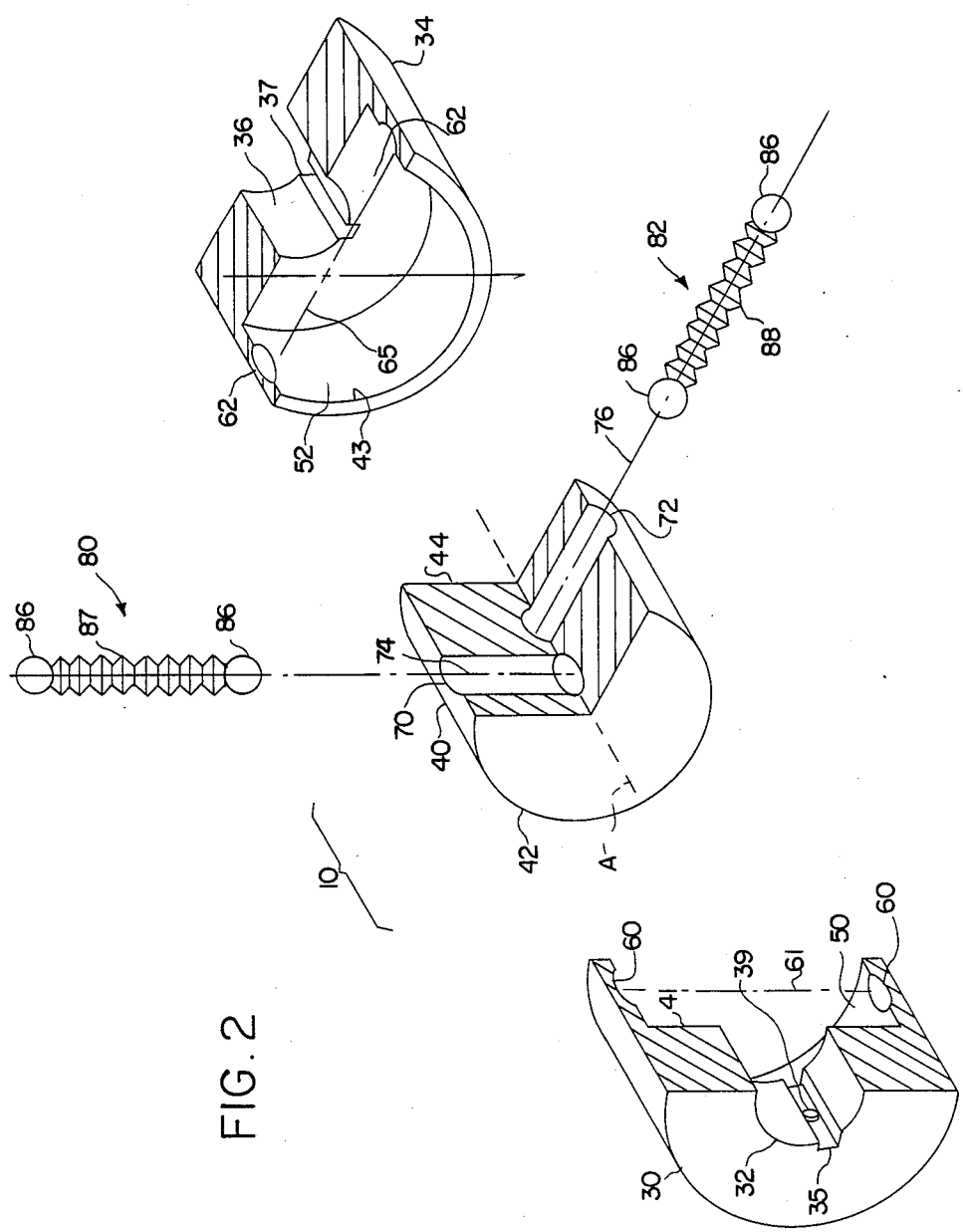
FIG. 2 is an exploded diagrammatic perspective view, partially in section, of a coupling according to the invention.

Referring to FIG. 2, coupling 10 has rigid torque-transmitting hub 30 with motor shaft aperture 32 to accomodate the end of motor shaft 12, and second rigid torque-transmitting hub 34 with a speed reducer shaft aperture 36 Hubs 30, 34 have keyways 35, 37, respectively, that accomodate keys (not shown) which hold hubs 30, 34 in rigid axial alignment with their respective shafts 12, 16, with set screws (not shown) screwed into set screw holes 39 (only one of which is shown) against the keys.

Hubs 30, 34 have on their inner sides, respectively, central bores 41, 43, each aligned with the rotational axis of its respective hub 30, 34. Rigid intermediate member 40 extends between hubs 30, 34 and is dimensioned such that its ends 42, 44 are loosely disposed in male-to-female relationship in central bores 41, 43, respectively, to form a pair of loose male-to-female joints spaced apart along the axis A of coupling 10, with open spaces between the end and side surfaces of intermediate member 40 and the opposed surfaces of hubs 30, 34. The open spaces about intermediate member 40 allow for adjustment of member 40 along and about the axis of the translatable element extending fixedly between the hub wall formations.

Inner peripheral wall 50 of central bore 41 has a pair of torque-transmitting detents 60 disposed opposite each other on a cross-axis 61 in a plane perpendicular to the rotational axis of hub 30. Similarly, hub 34 has a pair of torque-transmitting detents 62 disposed on inner peripheral wall 52 opposite each other on a cross-axis 65 in a plane perpendicular to the rotational axis of hub 34. Cross-axes 61, 65 are spaced apart along the rotational axis A of intermediate member 40. The diameter of the surface of the detents 60, 62 is less than that of the balls 84, 86 which register with them (see below).

Intermediate member 40 has a pair of cross-bores 70, 72 whose respective axes 74, 76 are perpendicular to the rotational axis of intermediate member 40 and at right angles to each other. Cross bores 70, 72 are spaced apart along intermediate member 40 such that their axes 74, 76 are in registration with, respectively, cross axes 61, 65 of detent pairs 60, 62.

Translatable member assemblies 80, 82 are inserted into cross bores 70, 72, respectively, each translatable member 80, 82 having a pair of bearing balls 84, 86, respectively, with a stack of Belleville washers 87, 88 between them, respectively. As shown more clearly in FIGS. 3a and 3b, when coupling 10 is assembled, washer stacks 87, 88 bias bearing pairs 84, 86 into detents 60, 62, respectively, such that there is circular line contact between bearings 84, 86 and rims 90, 92 of detents 60, 62.

In the embodiment of FIGS. 2 and 3a, intermediate member 40 has a diameter D, the circumferential gap has width, G, and the axis of the translatable member is spaced from the outer face of the respective hub by a distance, q. By way of example, in a coupling where D is 0.75 inch, the gap G is about 0.032 inch, and spacing 0, is about 0.16 inch.

Operation

In operation, during rotation of coupling 10 intermediate two rotating misaligned shafts, the contacting surfaces between bearing pairs 84, 86 and detents 60, 62 act as multi-directional rotational pivots between hubs 30, 34 and intermediate member 40. As coupling 10 rotates, translatable member assemblies 80, 82 both translate while simultaneously maintaining their perpendicular relationship to each other, and pivoting about their own axes 74, 76 relative to the axes 61, 65 of detents 60, 62, with the result that intermediate member 40 continually adjusts itself in nutating motion relative to the shafts to accomodate misalignment.

Because pre-loaded Belleville washers 87, 88 bias bearings 84, 86 in the direction of the axes 74, 76 of cross-bores 70, 72 into torque-transmitting, rotatable relationship with detents 60, 62, the cross loads exerted by translatable member assemblies 80, 82 against inner peripheral walls 50, 52 of hubs 30, 34 are substantially balanced throughout a cycle of nutation motion of coupling 10. The result is avoidance of imposition of cross loads upon the respective shafts.

Suitably constructed, coupling 10 can tolerate angular misalignment of shafts up to 15°, and axial (parallel) offset of about 35° of the diameter of bearing balls 84, 86. Consequently, coupling 10 provides highly accurate, substantially vibration-free transmission of power and motion, a characteristic particularly important in, e.g., robotics.

Belleville washer stacks 87, 88 may be closely fitted with the respective bores (e.g. clearance of 0.001 inch) and preloaded to provide a range of biasing load values for bearings 84, 86 against rims 90, 92 of detents 60, 62 in order to resist desired amounts of torque, and thereby to transmit loads. When a selected torsional load is exceeded, however, bearings 84, 86 disengage from detents 60, 62, but may re-engage when the torsional load is reduced again to the desired value. Thus, coupling 10 provides non-destructible overload protection at the same time that it accomodates shaft misalignment and avoids shaft side loading.

Furthermore, by the bearing balls making solid-to-solid contact about an entire circle, the balls are capable of driving in both forward and reverse rotational directions without backlash occurring at those bearing contacts.

Other Embodiments

Other embodiments are within the following claims. E.g., as shown in FIG. 4, coupling 100 differs from the embodiment of FIG. 2 in that split spacer spring 102 is slidably inserted into cross-bore 104 intermediate two stacks of Belleville washers 110 and bearings 114 which engage with detents 118 as discussed, above, in relation to the embodiment of FIG. 2.

Spacer spring 102 must be radially compressed for insertion into cross-bore 104 and, after insertion, presses radially outward against the cylindrical surface of bore 104 thereby stabilizing and reducing translation motion, and further promoting prevention of backlash. The pre-load compression of washers 110 are such that the individual washers in the stack contact each other with a pressure, e.g., of 45,000 psi. Therefore, the washers are strongly, frictionally restrained from lateral displacement. Hence there is thus in this embodiment virtually no backlash, i.e. the coupling behaves as if it were a solid shaft in regard to backlash or hysteresis.

In another embodiment, as shown in FIG. 5, coupling 130 has aluminum hubs 132, 134 having central bores 136, 138 into each of which are press-fitted tubular hardened steel sleeves 140, 142. Sleeves 140, 142 have walls 144 in which are pairs of torque-transmitting detaining holes 146 and 148 (not shown) diametrically opposite each other.

Intermediate member 150, its cross-bores, and translation member assemblies 154 (including hardened steel bearing bails 155) within the cross bores art identical in configuration to those described in connection with the embodiment of FIG. 2, above. Sleeves 140, 142 are disposed within central bores 136, 138 such that the centers of detaining holes 146, 148 are in registration with the axes of cross-bores 152.

Detaining holes 146, 148 are sized to retain, in circular line contact, bearing balls 155 while at the same time preventing bearing balls 155 from contacting the inner peripheral walls of central bores 136, 138.

In operation, surfaces 144 of sleeves 140, 142 serve as races for bearings 155 when over-torquing causes disengagement of bearings 155 from detaining holes 146, 148. Because bearings 155 and sleeves 140, 142 are hardened, heat and wear are reduced during periods of over-torquing and slippage.

In another embodiment, as shown in FIG. 6, intermediate member 260 has central bore portions 262, 264 into which are inserted the ends of machine shafts 266, 268 in male-to-female relationship. Shafts 266, 268 have cross bores 270, 272, respectively, whose respective axes, when the coupling is assembled, are perpendicular to the rotational axis A of intermediate member 260, and at right angles to each other.

Inner peripheral wall portions 274, 276 of central bores 262, 264, respectively, have pairs of hemispherical detents disposed so as to engage with ball bearing pairs 282, 284, respectively, which are translatably disposed within cross-bores 270, 272, respectively, and biased into the detents by Belleville washer stacks.

Numerous other embodiments can be constructed within the spirit and scope of the claims.

What is claimed is:

1. A coupling for a pair of end-to-end shafts comprising:

a pair of torque-transmitting hubs of rigid material disposed along the general rotational axis of the coupling;

an intermediate torque-transmitting member of rigid material having an axis extending between said shafts;

said hubs defining opposite ends of the coupling and each having attachment means to enable it to be secured to its respective shaft;

the inner side of each hub having a central bore aligned with the rotational axis of the hub;

said intermediate member having its respective ends disposed within the central bores of the respective hubs to form a pair of male-to-female joints with said hubs forming the female portions of said joints;

the inner peripheral wall of each of said central bores having a pair of oppositely disposed torque-transmitting engaging means, said engaging means comprising formations in the central bore lying on a cross-axis perpendicular to the axis of the respective hub;

said intermediate member having a pair of cross bores spaced apart along and perpendicular to the axis of said intermediate member, the axes of said cross bores lying in planes perpendicular to one another and positioned to register with respective pairs of said torque-transmitting formations in respective hubs;

each of said cross bores extending entirely through said intermediate member and being sized to receive a freely translatable, torque-transmitting translatable device comprising two end members and spring means therebetween for biasing said end members, said device being seated within said engaging means to transmit torque between the respective hub and the intermediate member, said end members being free to move simultaneously in unison in one direction or the other relative to said intermediate member, and in the manner that misalignment of said shafts and their respective hubs can be accommodated by free translational motion of said translatable devices relative to said intermediate member and pivoting motion between said intermediate member and said shafts about the axes of said translatable devices, permitting said intermediate member to continually adjust itself in nutating motion relative to said shafts, whereby in the event of misalignment of said shafts, said intermediate member can transmit torque between said two shafts without transmitting side loads therebetween.

2. The coupling of claim 1 wherein a said translatable device comprises two end members formed of rigid material disposed at the ends of the respective cross bores, and preloaded compressional springs disposed within said cross bores, biasing said end members into load-transmitting relationships with respective engaging means of the hub.

3. The coupling of claim 2 wherein said end members are comprised of wear-resistant material and have, at their ends, surfaces of revolution centered on the axis of said translational device and adapted to make circular bearing line contact with said engaging means to enable rotation of the intermediate member relative to the hub.

4. The coupling of claim 3 wherein said end members have subtantially spherical surfaces interfitted with respective engaging means.

5. The coupling of claim 4 wherein said end members comprise bearing balls.

6. The coupling of claim 2 wherein said compressional spring means comprises an axial assembly of Belleville washers aligned with the axis of the respective cross-bore, the compressional loading preventing lateral slippage between individual washers.

7. The coupling of claim 2 wherein said compressional springs comprises two spring portions separated by a stabilizing spacer located within the respective cross bore, said spacer being radially preloaded to press against the cylindrical surface of the bore to promote prevention of backlash.

8. A coupling between two end-to-end rotatable shaft means for transmitting torque, said coupling comprising:
an intermediate, torque-transmitting member disposed between and loosely related in male-to-female relationship with each of said shaft means, said intermediate member serving as one portion and the respective shaft means serving as the other portion of a pair of male-to-female joints spaced apart along the axis of said intermediate member, said female joints having an inner walls;
cross bores disposed in the male portion of the respective joint and a translatable device disposed in each of the cross bores, said translatable device comprising end member and spring means therebetween for biasing said end members, each of said translatable devices extending entirely through the male portion of its respective joint and having said end members heated in torque-transmitting relationship upon formations in the inner wall of a female portion of the joint;
each of said translatable devices being perpendicular to the axis of the male portion and lying in a plane perpendicular to the plane of the other of said translatable devices;
the end members of each of said translatable devices being free to move simultaneously in unison in one direction or the other relative to said male portion, unrestrainedly, in said bores on a translational axis relative to the male portion of the joint in which it resides in response to lateral motion of the female portion of said joint upon which said end members are seated, and the male and female portions of each of said joints being free to pivot relative to each other about said translational axis of the translatable device associated with said joint;
whereby, in the event of misalignment between said rotatable shafts, said intermediate member can undergo a free nutating motion, transmitting torque between said two shafts without transmitting sideloads therebetween.

9. The coupling according to claim 8 or 1 wherein the end members of each such translatable device comprises a pair of bearing balls and the spring means therebetween is compressional, and said formations comprise circular, outwardly-extending cavities in the inner wall of the bore of the female part of the respective joint.

10. The coupling of claim 8 or 1 wherein said translatable devices engage the engaging means in manner making simultaneous solid contact at different points about said engaging means capable of transmitting torque in the opposite directions of rotation of said shafts in a manner to prevent backlash.

11. The coupling of claim 10 wherein said engaging means include outwardly-extending indentations or holes in the inner wall of the female part of each joint.

12. A coupling for a pair of end-to-end shafts comprising:
a pair of torque-transmitting hubs of rigid material disposed along the general rotational axis of the coupling;
an intermediate torque-transmitting member of rigid material having an axis extending between said shafts;
said hubs defining opposite ends of the coupling and each having an attachment means to enable it to be secured to its respective shaft;
the opposite end of each hub having a central bore aligned with the rotational axis of the hub;
said intermediate member having its respective ends disposed within the central bores of the respective hubs to form a pair of male-to-female joints with said hubs forming the female portions of said joints;
the inner peripheral wall of each of said central bores having a pair of oppositely disposed torque-transmitting engaging means in the form of ball retaining formations, said formations lying on a cross axis perpendicular to the axis of the respective hub;
said intermediate member having a pair of cross bores spaced apart along and perpendicular to the axis of said intermediate member, the axes of said cross bores lying in planes perpendicular to one another and positioned to register with respective pairs of said torque-transmitting engaging means in respective hubs;
each of said cross bores extending entirely through said intermediate member and being sized to receive a freely translatable, torque transmitting device having ends seated upon said engaging means to transmit torque between the respective hub and the intermediate member in the manner that misalignment of said shafts and their respective hubs can be accommodated by free translation motion of said translatable devices relative to said intermediate member and pivoting motion between said intermediate member and said shafts about the axes of said translatable devices;

a said translatable device of each translational device comprising a pair of bearing balls, said bearing balls being free to move simultaneously in one direction or the other along the axis of said cross bore relative to said intermediate member, said balls sized to be retained by said engaging means, said engaging means having the form of ball-retaining formations, with circular line-contact with said balls, and compressional springs disposed between the balls of each pair in a respective cross bore for biasing said balls into the respective ball-retaining formations and to permit rotation of said balls relative to the respective engaging means to accommodate rotation of said hubs despite parallel or angular misalignment of the respective shafts.

13. The coupling according to claim 8 or 1 wherein the end members of said translatable devices disengage from the formations in which they are seated when a selected torsional operating load is exceeded and re-engage said formations when the torsional load is reduced again to said selected torsional operating load.

14. The coupling of any of claims 12, 8, or 1 wherein the female portion of each joint is comprised of an aluminium outer body and a hardened tubular steel insert, said insert disposed in a bore of said female portion, said insert having opposite holes or depressions which define formations for engagement by said translatable devices.

* * * * *